G. M. STERNBERG.
ELECTROMAGNETIC REGULATOR FOR DAMPERS OR VALVES.
No. 100,462.    Patented Mar. 1, 1870.
Fig. 1.
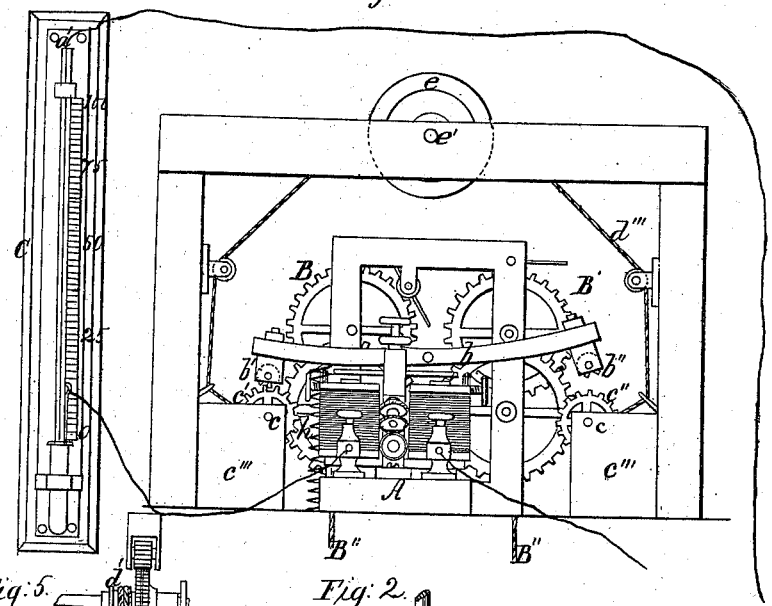
Fig. 5.    Fig. 2.
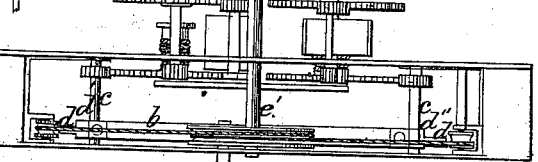
Fig. 4.    Fig. 3.
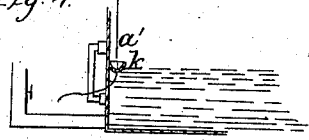    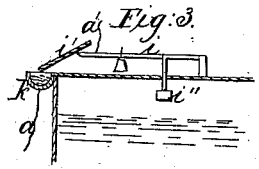
Witnesses:    Inventor;

United States Patent Office.

GEORGE MILLER STERNBERG, OF FORT RILEY, KANSAS.

Letters Patent No. 100,462, dated March 1, 1870.

ELECTRO-MAGNETIC REGULATOR FOR DAMPERS OR VALVES.

The Schedule referred to in these Letters Patent and making part of the same

*To all whom it may concern:*

Be it known that I, GEORGE MILLER STERNBERG, of Fort Riley, in the county of Davis, and State of Kansas, have invented a new and improved Automatic Regulator for Valves, Dampers, &c.; and I do hereby declare that the following is a full, clear, and exact description of the construction and operation of the same, reference being had to the accompanying drawings making a part of this specification, in which—

Figure 1 is a side elevation, including a view of a regulating-thermometer interposed in the electrical circuit.

Figure 2 is a plan view.

Figure 3 is a detached view of an apparatus for regulating the pressure of steam in a boiler.

Figure 4 is a detached view of a reservoir-feed, similarly provided.

This invention consists in a two-sided clock-mechanism, by means of which a valve may be turned to the right or left, thus increasing or diminishing the flow of any gas or liquid through it.

The valve-moving mechanism is regulated by a lever, which throws one or the other side of the apparatus into gear, causing the valve to be gradually turned on or off. This lever is worked by a temporary magnet, which, when an electrical current circulates through its helix, attracts an armature attached to the lever.

A galvanic battery of any kind may be used to produce the required electric current.

Interposed between the helix of the temporary magnet and the galvanic battery is the regulator, which, by establishing and breaking the current, as required, causes the lever worked by the temporary magnet to throw one or the other side of the valve-operating apparatus into gear. This regulator varies in different cases.

When the temperature of a gas or liquid is to be regulated, the regulator is a thermometer immersed in it, and so constructed that the rising or falling of the mercury in the thermometer establishes or breaks the circuit.

When the pressure of steam or gases is to be regulated, the regulator may be a safety-valve or a steam-gauge, interposed in the circuit, so that the rising or falling of the lever of the safety-valve or the needle of the steam-gauge may make or break the circuit.

When the height of a liquid in a reservoir is to be regulated, a cup of mercury floating upon its surface establishes the circuit, by meeting or receding from an adjustable wire.

In the drawings—

A is a helix, surrounding a temporary magnet, conveniently placed with reference to the double system of train-work B B', which is kept in motion by weights B" B"'.

One wire, *a*, of the battery runs into the bulb of a thermometer, C, supposed to be hung against the wall of an apartment, and has contact with the mercury.

The other wire, *a'*, enters the top of the thermometer-tube and terminates at the point in the scale where the temperature of the room should be kept. Whenever the mercury is below this point, the valve by which warm air enters the room is gradually opening.

When the atmosphere of the place is sufficiently heated to cause the mercury to rise so that it touches the end of the wire *a'*, an electric circuit is established, and the armature *a"* attached to the coils.

The armature thereupon operates, by the lever *a'''*, to elevate one end of a lever, *b*, and depress the other end.

The extremities of the lever *b* bear small spur-gears *b' b"*, immediately under which, at a distance sufficient for a slight play of the lever, are two cog-wheels *c' c"*, placed at the ends of shafts *c c*, which are sustained in suitable bearings *c''' c'''*. At their opposite ends the shafts *c* are connected with the double system of train-work B B', each half of the system being, in all respects, like the other half, and each set in motion in the same direction by weights B" B".

There is loosely placed on each shaft *c*, a cog-wheel *d*, of the same size and serration as the wheels *c' c"*, and quite near the latter, but not necessarily in contact, the wheels *d* having windlasses *d' d"* connected with them, and inclosing the shaft *c*.

Around the windlasses *d' d"* are wound the extremities of a cord, *d'''*, which cord, at its middle portion, passes over or around a wheel, *e*, fixed upon the valve-shaft *e'*, so as to produce sufficient tension to turn the wheel, and thus operate the valve when the cord moves in either direction, owing to the rotation of the windlasses *d' d"*, but the wheels and windlasses *d d'* and *d d"*, being loose on their shafts, can only receive motion from the train-work B B', when thrown into gear, in some manner, therewith, and they are alternately thus thrown into gear by the small spur-gears *b' b"*, on the ends of the lever *b*, the spur-gears being wide enough to engage with both wheels *c' d* or *c" d* at once, and thus connect them and communicate motion of the train-work to the valve-operating mechanism.

When the right spur-gear engages with the wheel *c"*, under the operation of the levers *a''' b*, the half B' of the double system of train-work is thrown into gear with the wheel *d*, and moves the valve *e"* in the direction of closing. The valve either wholly or partially closes, according to the time required to lower the temperature of the room sufficiently to cause the mercury to sink below the wire *a'*.

When this happens, and the electric current is broken, the left spur-gear *b'* is made to engage, by a spring, *h*, or weight, with the opposite wheels *c' d*, which are rotated in the contrary direction to the wheels $c''$ $d$, and thus cause the valve to swing in the direction of opening.

The windlass $d''$, being loose on its shaft, reverses its motion under the strain of the cord $d'''$, without interfering with the wheel $c''$, which still revolves undisturbed in its original direction. The same is true of the windlass $d'$, when the valve is closing.

In this manner the temperature of any room heated by warm air from a furnace may be kept at any particular point without varying more that about half a degree on either side, as long as the supply-current continues to flow.

When the object to be obtained is the regulation of the temperature of a gas or liquid, the thermometer $c$, fig. 1, is immersed in it. This thermometer has a wire permanently communicating with the mercury in its bulb, and an adjustable wire which may be slipped into its tube for any desired distance.

The end of the adjustable wire having been thrust into the thermometer-tube to the point at which the temperature is to be maintained, and the valve-operating apparatus put in motion, the temperature of the liquid or gas is raised by the gradual opening of the valve which governs the supply of heat. This valve may be the damper of a furnace, or a damper in a hot-air flue, a cock in a steam-pipe used for heating, or any similar contrivance.

When the increasing temperature of the liquid or gas causes the mercury in the tube of the thermometer to reach the wire, an electric circuit is completed, the current through the helix A causes the temporary magnet to attract the armature $a''$, and the lever attached to it throws out of gear the valve-opening part of the apparatus and into gear the valve-closing part. The consequence of this is a gradual reduction of the heat of the gas or liquid, resulting from the gradual closing of the valve. This reduction of the temperature causes the mercury in the thermometer to fall below the point of the wire, and the electric circuit to be broken, and the valve-opening part of the apparatus to again operate. Thus the mercury oscillates at the point of the wire, establishing and breaking the circuit, and the liquid or gas is kept nearly at a constant temperature.

Having thus described my invention,

What I claim as new, and desire to secure by Letters Patent, is—

The combination, with the armature of an electric apparatus, of the levers $a'''$ and $b$, the latter being provided with spur-gears $b'$ $b''$, cog-wheels $c'$ $c''$, double system of train-work B B', operated by weights, and loose cog-wheels $d$, substantially in the manner described, and for the purpose of communicating motion alternately in opposite direction to the valve.

GEO. M. STERNBERG.

Witnesses:
NATHAN K. ELLSWORTH,
SOLON C. KEMON.